(No Model.)

J. B. JONES.
NUT LOCK.

No. 477,010. Patented June 14, 1892.

Witnesses:
Geo. Steers,
A. D. Wood.

Inventor.
John B Jones
By W B Wood
Att'u.

United States Patent Office.

JOHN B. JONES, OF CHICAGO, ILLINOIS, ASSIGNOR OF TWO-THIRDS TO GEORGE M. ILLINGWORTH AND HENRY L. CARROLL, OF SAME PLACE.

NUT-LOCK.

SPECIFICATION forming part of Letters Patent No. 477,010, dated June 14, 1892.

Application filed August 6, 1891. Serial No. 401,923. (No model.)

*To all whom it may concern:*

Be it known that I, JOHN B. JONES, a citizen of the United States, residing at Chicago, county of Cook, State of Illinois, have invented a new and useful Nut-Lock, of which the following is a specification.

My invention relates to devices for locking or holding the nuts of bolts from turning thereon when once they have been screwed down to place.

The advantages of this device are that it is simple, quickly operated to lock or unlock the nut, readily applied to and used with ordinary bolts, such as are obtained from the regular trade, thus obviating the necessity of special construction of the bolt or nut, as is common with most such devices now in use.

While this device may be particularly adapted to locking and holding the nuts of bolts employed to secure the meeting ends of a railway-track together with the use of fish or angle plates, it is equally applicable to locking the nuts of bolts used in bolting together the timbers of bridges or other wooden structures where bolts are used.

In the accompanying drawings, forming a part of this specification, is illustrated a nut-lock constructed in accordance with this invention and its mode of application, in which—

Figure 1:
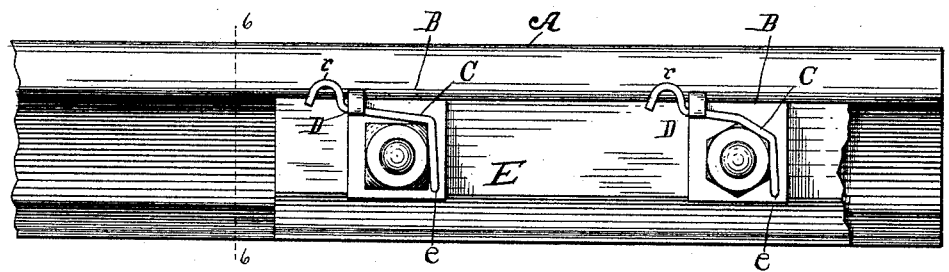
Figure 2:
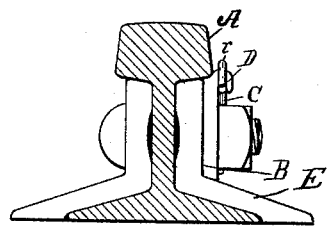
Figure 3:
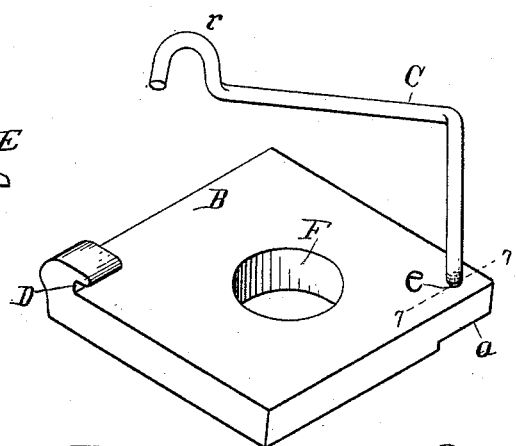
Figure 5:
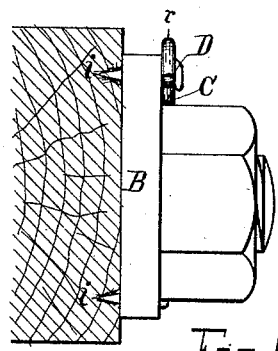
Figure 4:
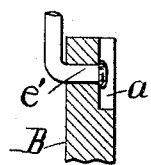

Figure 1 is a side elevation of a broken end of a railway-rail and angle-plate, showing my improved nut-lock applied to a square and hexigon nut. Fig. 2 is a vertical cross-section on line 6 6 of Fig. 1. Fig. 3 is a perspective view of the nut-lock, detached. Fig. 4 is a section of a broken portion of Fig. 3 on line 7 7. Fig. 5 shows the invention applied to wooden structures, with a piece of timber in cross-section.

Similar letters of reference refer to similar parts throughout the several views.

Referring to the lettered parts of the drawings, B represents a rectangular plate or washer, having the hole F at or near its center, as shown in Fig. 3, for the purpose of receiving the bolt G. It is also provided with the catch D at or near one of its corners and on its outward surface.

C represents a locking-lever pivotally attached to plate or washer B at *e*, near the corner, or at a point which is nearly diagonally opposite the catch D. A portion of plate or washer B is removed at *a* from its thickness to allow of heading over the pivotal portion *e'* of lever C, as shown in Fig. 4, thus preventing said lever from becoming detached or lost from plate B. Said lever is preferably made of spring-wire of a size corresponding to the size of the nut, and is bent to conform to and fit to contiguous facets of the nut to be locked, as shown in Figs. 1 and 3.

In application plate B is placed on the bolt G behind the nut H and serves the purpose and takes the place of a washer. The nut is screwed down against said plate to its proper position when lever C is brought up against the facets of the nut and sprung down and engaged in catch D at or near its free end, thus securely holding the nut from turning. The elasticity of lever C serves to always retain it in position in catch D and prevent it from unlocking. To unlock the nut for readjustment or to remove it from the bolt, spring lever C down out of catch D by pressing down on loop *r* and allow it to recede from the nut sufficiently to be out of the way, as in Fig. 3, when the nut may be readjusted and again locked in position. It is obvious that the nut may be as securely locked from turning when left slightly loose as when firmly screwed down on plate B.

To prevent plate B from turning when used in connection with railway-rails, its upper and lower edges are made to engage the rail A and angle-plate E, respectively, as shown in Figs. 1 and 2. To prevent said plate from turning when used in connection with wooden structures, it is provided with lugs or pointed projections *i i*, protruding from its back surface, which indent themselves into the surface of the wood when the nut is firmly screwed down on said plate, as shown in Fig. 5. This construction may be employed in connection with many metallic structures by providing indentures in the surface of the metal to which said plate is to be applied, to receive said lugs.

It is obvious that the plate or washer B may be made round or other shape than rectangular when the lugs *i* are employed to prevent its turning.

Having thus fully described my invention, what I claim as new, and desire to secure by Letters Patent, is—

1. In a nut-lock, the combination, with a bolt and nut, of a washer provided with the central aperture F, catch D, and lugs $i$, the spring locking-lever C, pivotally attached thereto at a point diametrically opposite said catch and bent to conform to and engage two contiguous facets of a nut between the point of pivoting and the free end thereof, substantially as shown and specified.

2. In a nut-lock, the combination, with a bolt and nut, of a washer provided with the central aperture F and catch D, the spring locking-lever C, pivotally attached thereto at a point diametrically opposite said catch and bent to conform to and engage two contiguous facets of a nut between the point of pivoting and the free end thereof, substantially as shown and specified.

In testimony of the foregoing I have hereunto subscribed my name in presence of two witnesses.

JOHN B. JONES.

Witnesses:
RUFUS KING,
GEO. P. SMITH.